Nov. 8, 1960  J. O. GRAYBEAL  2,959,526
CONTINUOUS ELECTRODE ELECTRICAL FURNACE
Filed May 25, 1954  4 Sheets-Sheet 2

INVENTOR.
JOHN O. GRAYBEAL
BY
James E. Toomey
ATTORNEY

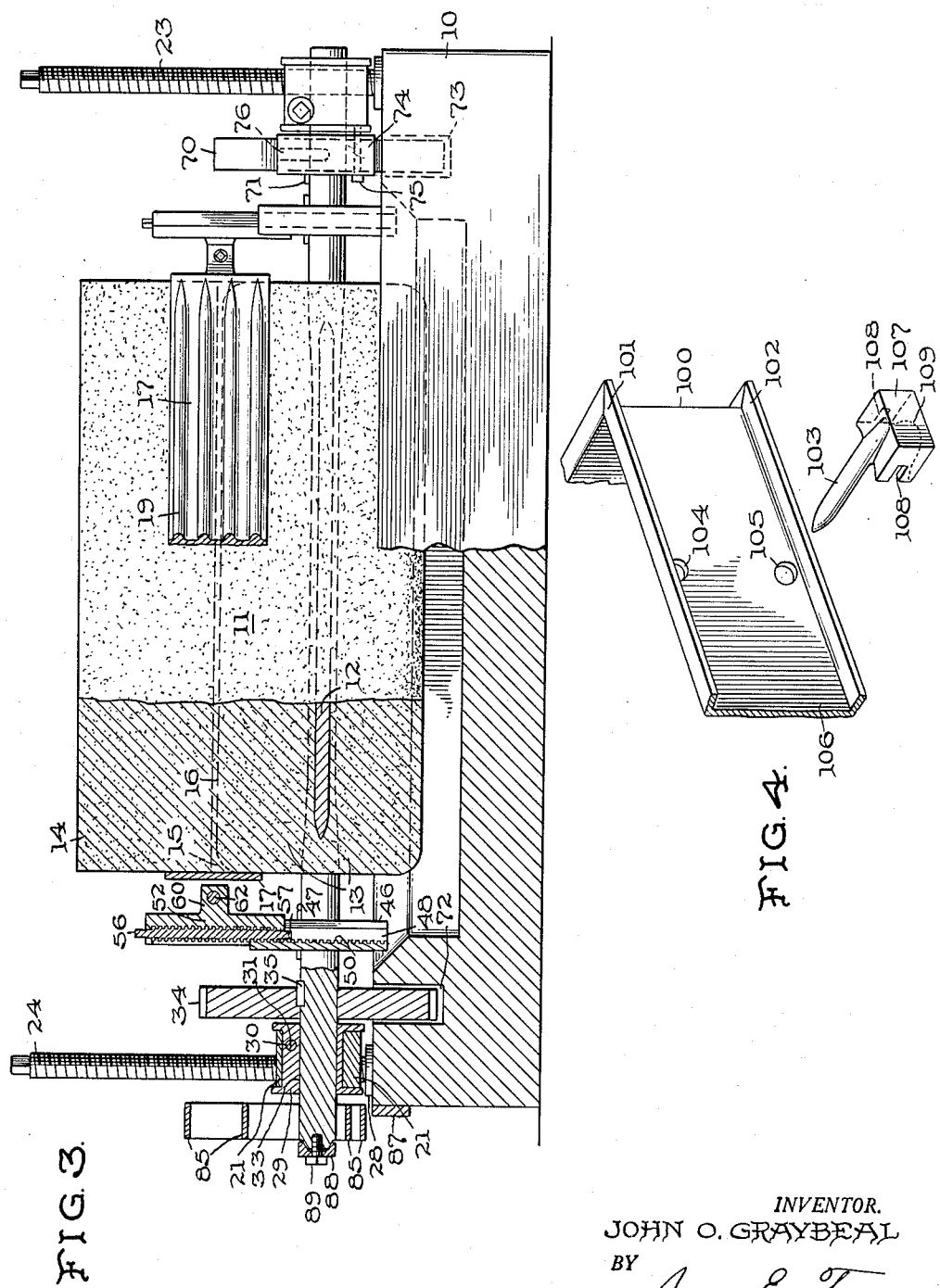

Nov. 8, 1960 J. O. GRAYBEAL 2,959,526
CONTINUOUS ELECTRODE ELECTRICAL FURNACE
Filed May 25, 1954 4 Sheets-Sheet 4

FIG. 5.

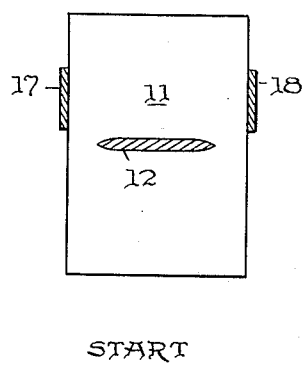

START

FIG. 6.

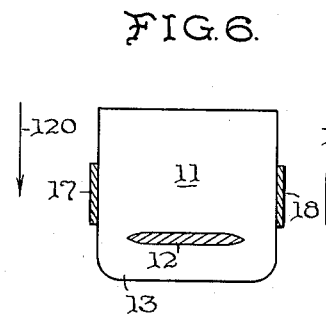

LOWER ELECTRODE
PORTION CONSUMED

FIG. 7.

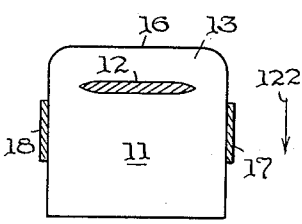

ELECTRODE ROTATED
AND ERODED SURFACE
CLEANED

FIG. 8.

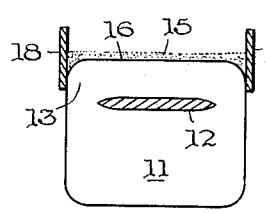

MOLD SECTIONS
REPOSITIONED
AND ELECTRODE
MAT'L IN PASTE
FORM APPLIED TO
ERODED SURFACE

FIG. 9.

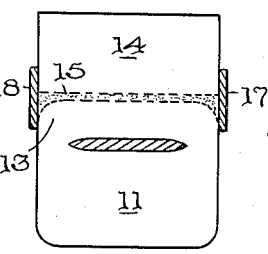

PRE-FORMED BLOCK
OF ELECTRODE MAT'L
BONDED TO ERODED
SURFACE BY BAKING

AFTER LOWER ELECTRODE
PORTION AGAIN CONSUMED
AS IN FIG. 6, ELECTRODE
AGAIN ROTATED AND
RENEWAL STEPS OF
FIGS. 7, 8 AND 9 REPEATED.

INVENTOR.
JOHN O. GRAYBEAL
BY James E. Toomey
ATTORNEY

United States Patent Office 2,959,526
Patented Nov. 8, 1960

2,959,526

CONTINUOUS ELECTRODE ELECTRICAL FURNACE

John O. Graybeal, Buckley, Wash., assignor to Kaiser Aluminum & Chemical Corporation, Oakland, Calif., a corporation of Delaware Filed May 25, 1954, Ser. No. 432,080

17 Claims. (Cl. 204—67)

This invention relates to electric furnaces employing electrodes of the continuous type, and more particularly relates to improved continuous electrodes of the carbon type, such as employed in electric furnaces for the electrolytic production of aluminum.

This application is a continuation-in-part of copending application Serial No. 246,431, filed September 13, 1951, issued June 1, 1954, as Patent No. 2,680,142.

In the aforementioned application there is described and claimed an electric furnace employing electrodes of the continuous type, and the method of operation thereof, wherein the consumable electrode material constituting the continuous electrode is arranged about an elongated, rotatable, metallic conductor or core member arranged for rotation in a horizontal plane over the furnace bath, the non-metallic electrode material, such as carbon, having a lower baked portion and an upper unbaked portion. The consumed portion of the electrode is replenished at the upper surface by progressively depositing electrode paste material thereto, which material is adhered to the eroded electrode surface by baking as a result of heat evolved through continued operation of the electric furnace. By such previous arrangement, the continuous electrode is restored to substantially its original thickness and may be progressively rotated in a manner so that the lower baked portion of the layer of electrode material is progressively immersed in the furnace bath and is in large portion consumed, while progressively depositing unbaked electrode paste material upon the eroded electrode surface which has previously passed through the furnace bath to restore the original thickness of the electrode.

It is an object of the present invention to provide an improved consumable electrode of the continuous type, wherein a consumed electrode portion is renewed or replenished by bonding to the eroded surface of the electrode a pre-formed block of electrode material.

It is a further object of this invention to present an electric furnace utilizing a consumable electrode of the continuous type, in which greater efficiency of operation is made possible by use of pre-formed blocks of electrode material with consequent relatively higher effective electrode density and greater current-carrying capacity.

It is a further object of the present invention to present a method of replenishing an electric furnace continuous electrode consumed by operation of the furnace, whereby the consumed portion of the electrode is restored by bonding electrode material thereto by use of electrode paste material without substantial exposure of such electrode paste material to the deleterious effects of the atmosphere while at baking temperature.

It is yet another object of the present invention to present an electric furnace employing a consumable electrode of the continuous type, wherein the necessity for periodic removal of electric contact studs or other conductor members of conventional design is eliminated.

It is an additional object of the present invention to present a consumable electrode of the continuous type, wherein is employed a horizontally disposed, metallic conductor member having substantial dimensions in horizontal longitudinal and lateral section, the lower surface of which is generally equispaced from the effective electrode surface in order to more uniformly distribute the electric current density over the entire lower surface of the anode during operation of the furnace.

It is yet another object of the present invention to provide improved efficiency of operation than available from electric furnaces of the type conventionally employing preformed electrodes, wherein such pre-formed electrode material need not be individually rodded, i.e. provided with individual conductor members. It is a related object and advantage of the present invention to eliminate waste of electrode material such as normally results from discard or reprocessing of unconsumed portions of conventional pre-formed electrodes.

It is an additional object of the present invention to materially reduce the amount of noxious fumes from escaping volatiles evolved in operation of electric furnaces employing consumable electrodes of the continuous type.

These and other objects and advantages will be apparent from the following description of the invention.

According to the present invention, the consumed portion of a consumable electrode is restored or replenished by bonding to the eroded surface of the electrode a pre-formed block of electrode material. Such bonding is accomplished by applying to the eroded surface of the electrode a layer of electrode material in paste form and superposing thereon the pre-formed block of electrode material. As an additional feature of this invention, mold sections are provided to substantially surround the boundaries of the eroded surface of the electrode, which mold sections also serve to restrain and confine the electrode paste material to the area of the eroded surface, to substantially completely exclude atmosphere therefrom during subsequent baking, and to promote adherence of the eroded surface and the pre-formed block of electrode material. These mold sections additionally serve to restrain relative movement of the unconsumed electrode portion and the pre-formed block of electrode material during bonding thereof and during concurrent or subsequent manipulation of the restored electrode to current-carrying position in the electric furnace.

Certain other features of the present invention relate to apparatus for vertically, horizontally and rotatively manipulating a continuous electrode of the type presented, which apparatus exhibits simplicity of operation and ease of disassembly.

In order to illustrate a specific example of the present invention as applied to an electric furnace for the electrolytic production of aluminum, reference is made to the accompanying drawings, which are schematic in character and partly in section, with various details of the electric furnace construction known to the art having been omitted for clarity of illustration.

Fig. 1 is a top plan view of an electric furnace utilizing continuous electrodes of an exemplary form as contemplated by the present invention, with various parts shown in interrupted end dimension.

Fig. 2 is a side elevational view along line 2—2 of Fig. 1, showing various details of continuous electrodes as contemplated by the present invention and manipulative apparatus therefor. The left-hand electrode in the view of Fig. 2 is shown at the cycle of operation subsequently presented diagrammatically in connection with Fig. 9, and the right-hand electrode in the view of Fig. 2 presents the electrode position in the cycle of operation as subsequently schematically presented in connection with Fig. 6.

Fig. 3 is an end elevational view with various parts shown in section along line 3—3 of Fig. 1, the end dimension of the electric furnace being shown in full.

Fig. 4 is a perspective view of a segment of a modified mold section and one of the retaining pins associated therewith, for alternative use with the type of electrode manipulation arrangement presented in Figs. 1–3.

Figs. 5 through 9, inclusive, diagrammatically illustrate successive stages of operation of a consumable electrode of the continuous type in accordance with the present invention.

Figure 1:
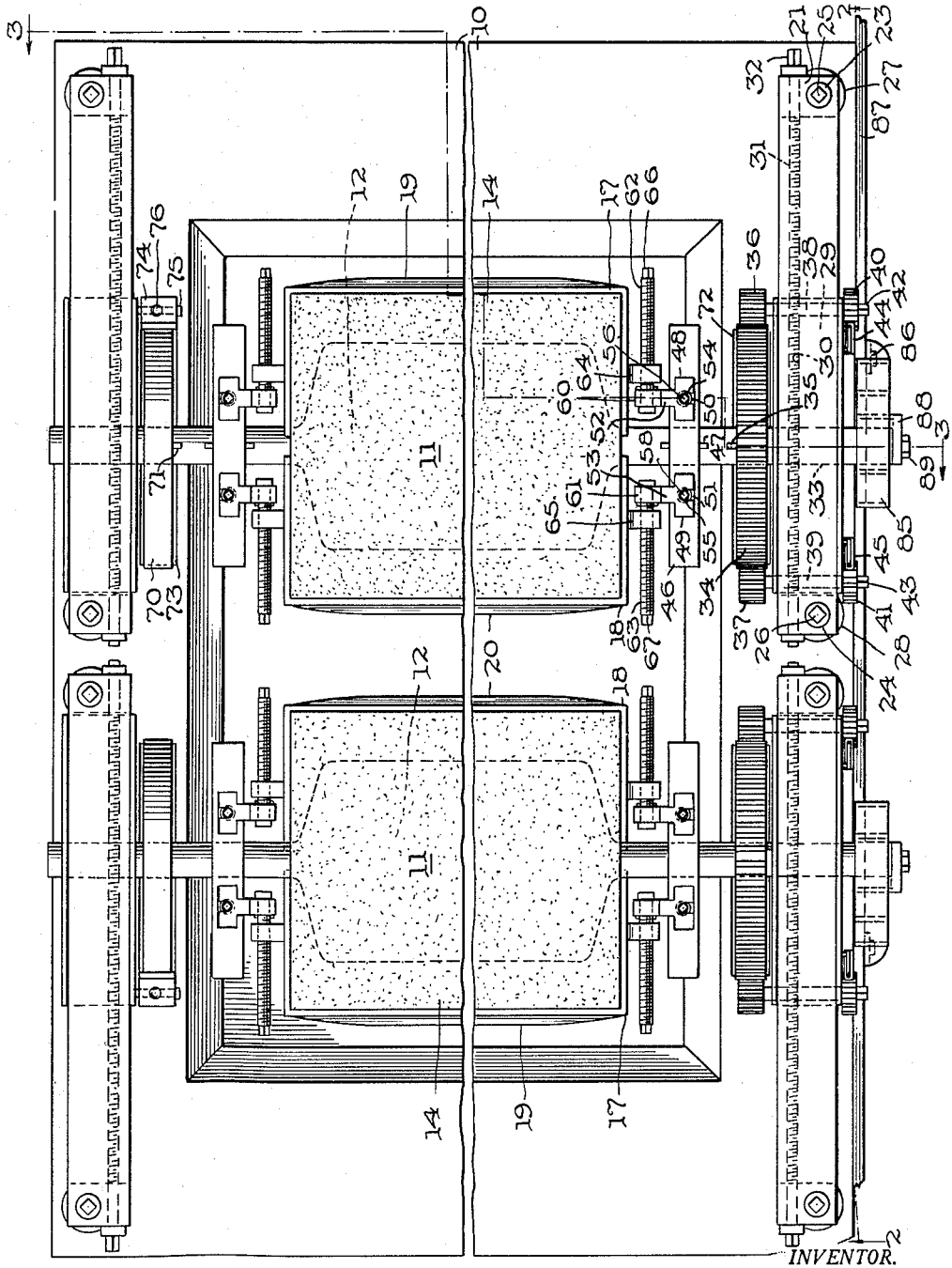
Figure 2:
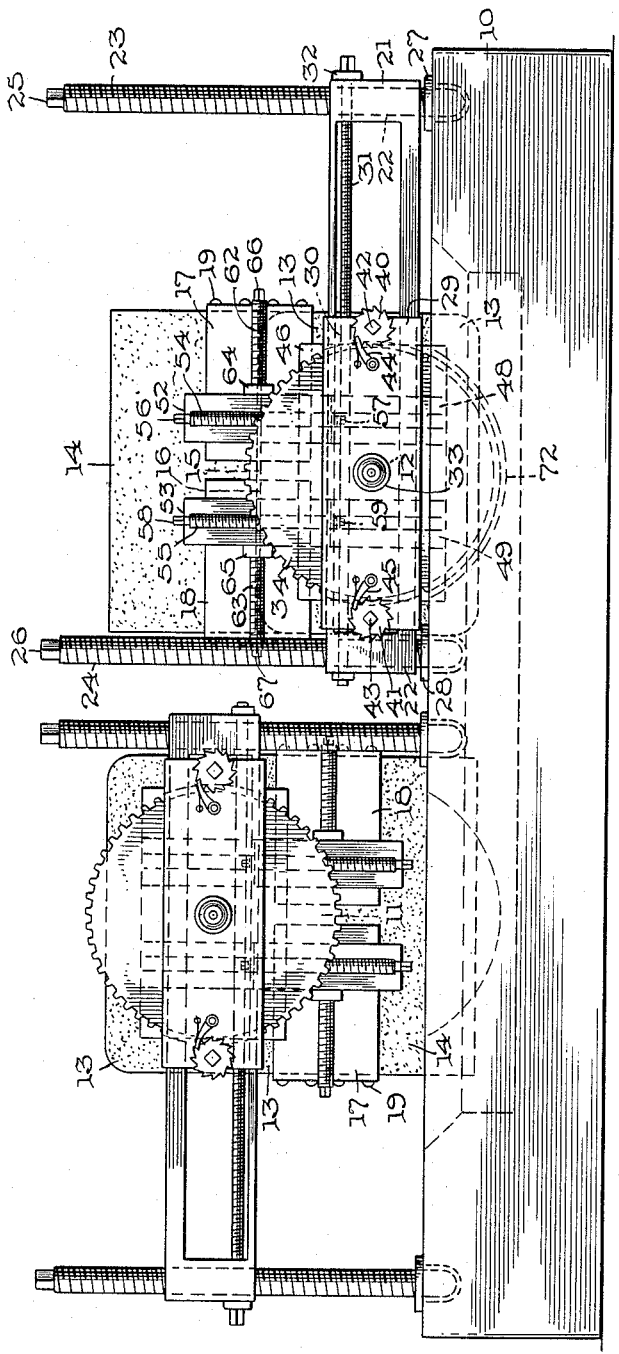

Referring to Figs. 1 through 3, in which like parts are designated with like reference numerals for the sake of clarity, the furnace pot or cathode 10 of generally conventional design has arranged thereover a plurality of non-metallic consumable carbon electrodes, generally indicated at 11, each serving as an anode and each having arranged about a rotatable metal conductor 12 a baked, unconsumed electrode portion 13, a pre-formed block 14 of electrode material, such as carbon, and a layer 15 of electrode material, such as carbon paste, applied to an eroded surface 16 of unconsumed electrode portion 13, which layer 15 is in paste form as applied, and which layer 15 progresses to baked condition to bond pre-formed block 14 to eroded surface 16 by heat evolved from continued operation of the electric furnace. As shown, in surrounding and restraining relation with respect to the contiguous external portions of unconsumed electrode portion 13, pre-formed block 14 and layer 15 of electrode paste material, are mold sections 17 and 18, respectively having strengthening ribs 19 and 20, as desired.

As discussed in greater detail hereinafter, conductor 12 and associated electrode 11 are mounted over furnace cathode 10 in a manner allowing vertical, horizontal and rotative adjustment enabling the necessary manipulation of the electrode 11 during the operation cycle of the electric furnace. In this connection, the several apparatus arranged at each end of each electrode 11 for manipulation thereof are quite similar in function and construction, it being understood that corresponding arrangements merely involve a reversal of parts, as shown. Accordingly, one such manipulative arrangement will be described in detail and will serve to explain the constructional arrangement of corresponding portions of the entire electrode manipulative structure, except as otherwise designated.

In the embodiment of the invention illustrated, vertical adjustability for horizontally disposed conductor 12 and the electrode structure 11 bonded thereto is accomplished by means of vertically adjustable cradles 21, each having threaded portions 22 mated with vertically upstanding screw elements 23 and 24, respectively provided with wrench engaging heads 25 and 26, said screw elements 23 and 24 in turn being removably supported by bearing wells 27 and 28, recessed in the supporting structure of cathode 10, as shown. Cradles 21 are provided with a cut-away portion accommodating horizontally movable carriages 29, each having a threaded portion 30 mated with screw member 31, in turn provided with a wrench engaging screw head 32, said screw member 31 being supported in journalled portions of cradles 21, as shown. Said carriages 29 are provided with journalled bearing portions 33, supporting the ends of conductor 12. Keyed in proximate relation with a carriage 29 on conductor 12 is planetary gear 34, as by a suitable keying device 35, said planetary gear 34 being selectively rotatable in either direction by an arrangement of pinion gears 36 and 37, respectively mounted on shafts 38 and 39 supported by said carriage 29, said shafts 38 and 39 also mounting ratchet gears 40 and 41, in turn provided with wrench engaging heads 42 and 43 and cooperating with spring pressed pawl means 44 and 45, mounted on said carriage 29, in a manner enabling selective incremental rotation of conductor 12.

In addition to the selective horizontal, vertical and rotative manipulation of the conductor 12 and associated electrode 11 by the mechanism above described, advantageous features of the invention also require rotation of mold sections 17 and 18 while in restraining relation with respect to said electrode 11, as well as requiring selective movement of said mold sections 17 and 18 both perpendicular to and parallel to the external contiguous surfaces of electrode portion 13 and pre-formed block 14, i.e. selective vertical and horizontal adjustability of the mold sections with respect to said electrode 11.

Such manipulation of the opposed mold sections is accomplished in the following typical manner. Key blocks 46 are fastened to conductor 12 by suitable means, such as key 47, and provided with keyways 48 and 49, in turn provided with internal screw threaded racks 50 and 51, as shown. Arranged for vertical movement in keyways 48 and 49 are key elements 52 and 53, respectively provided with screw elements 54 and 55 in engaging relation with racks 50 and 51. Screw elements 54 and 55 are in turn provided with wrench engaging screw heads 56, 57, 58 and 59, as shown, to facilitate vertical adjustment of key elements 52 and 53 with respect to key block 46, regardless of rotative position of key block 46. Key elements 52 and 53 each have a protruding journalled bearing portion, designated at 60 and 61, mounting respective screw elements 62 and 63 in threaded engagement with extended portions 64 and 65 of respective mold sections 17 and 18, in a manner allowing retractive adjustment of mold sections 17 and 18 with respect to electrode 11 by actuation of screw elements 62 and 63 through wrench engaging screw heads 66 and 67 respectively provided thereon.

For equal weight distribution and for further control of rotation of the electrode 11, there is arranged at the opposite end of conductor 12 from planetary gear 34 a counterbalance wheel or drum 70, fastened to conductor 12 by suitable means such as key 71. In constructional arrangement, planetary gear 34 and counterbalance drum 70 are accommodated in lowermost positions by recessed arcuate portions 72 and 73 provided in cathode 10, as shown. As desired, drum 70 may coact with suitable braking means such as a brake shoe 74 pivotally anchored as by pin 75 to adjacent carriage 29, in spring pressed relation with drum 70 to selectively restrain or control rotation of conductor 12 and associated electrode 11. Such braking action, which may be applied or released by pressure from a lever bar inserted in a suitable recessed portion 76 of brake shoe 74, may serve alternatively or conjunctively with planetary gear 34 to control rotation of said conductor 12, since at stages in the cycle of operation of the electric furnace requiring rotation of conductor 12 the electrode 11 is relatively top heavy with respect to the axis of rotation, as explained in greater detail hereinafter. Such braking action also serves a safety function in providing means for restraining rotation of the conductor 12 in the event of malfunction of the rotative means comprising planetary gear 34.

Electrical connection of conductor 12 and electrode 11 to the external power line is advantageously accomplished by means of a spirally arranged connector 85, connected at one end 86 to buss bar 87 and at the other end 88 to the end of conductor 12 by suitable pressure contact means, such as bolt 89, such electrical connector contact means 85 through 89 having been omitted from Fig. 2 for clarity of other detail. It will be discerned that a spiral type of connector, such as connector 85, although not essential to the basic features of the invention, provides an advantageous arrangement allowing a considerable degree of vertical, horizontal and rotative adjustment of conductor 12 with only occasional adjustment of the connection thereof to conductor 12. By a pressure connection through coacting flared portions provided in the end of conductor 12 and end 88 of connector 85, a good electrical connection is accomplished which is adjustable for change in rotative position of conductor 12 simply by loosening and retightening bolt 89.

Fig. 4 serves to illustrate in perspective view a segment of a mold section of modified design, two of which may be used in lieu of mold sections 17 and 18, of the arrangement presented in Figs. 1 through 3. This modified mold section 100 is provided with an upper flange edge 101 and lower flange edge 102 for the purpose of structural strength and for the purpose of coacting in positioning engagement with retaining pins 103, insertable through upper aperture 104 and lower aperture 105 provided (only one of each being shown) in side 106 of mold section 100 in a manner to be embedded in the contiguous side portions of electrode portion 13 and pre-formed block 14. Retaining pins 103, an exemplary form of which is illustrated in Fig. 4 in perspective alignment with one of lower apertures 105, are provided with a slotted base portion 107, the slotted portions of which are adapted to engage flange 102 or flange 101 when a retaining pin 103 is in inserted position. Also provided in end portion 107 of retaining pin 103 is a suitable recessed portion 109 for ready removability of retaining pin 103 from embedded relation with electrode 11 and engaging relation with mold section 100. It will be understood that retaining pin 103 is readily insertable in upper apertures 104 by rotation of slotted base portion 107 to arrange the slots thereof in upper position. It will also be understood that the primary function of retaining pins 103 in the type of mold section presented in Fig. 4 is that of further restraining relative movement between electrode portion 13 and the pre-formed block 14 while the pre-formed block 14 is being bonded to unconsumed electrode portion 13 and while the electrode assembly is being manipulated to current-carrying position. Retaining pins 103 otherwise serve to support a considerable portion of the weight of pre-formed block 14 when in current-carrying position at the stage in the cycle of operation of the electrode corresponding to that illustrated by the left-hand electrode shown in Fig. 2. Thus, by use of the modified mold section of the type illustrated in Fig. 4 and by use of retaining pins of the type disclosed in association therewith, the bond provided by the layer 15 of electrode material between pre-formed block 14 and unconsumed electrode portion 13 is further restrained from rupture or cleavage until a substantial period of curing of the bond layer by passage of electrical current therethrough and until a substantial portion of pre-formed block 14 is consumed and consequently lightened by continued operation of the furnace. It is additionally contemplated that other mold section arrangements may be employed to perform the function of effectively restraining relative movement of the unconsumed electrode portion 13 and pre-formed block 14. By way of further example, such alternative arrangements may involve other interfitting mold and electrode surface configurations, such as horizontally arranged corrugations of the facing mold section and electrode surfaces.

Having now described the various apparatus for manipulating a continuous electrode in accordance with the present invention, and the general electric furnace arrangement which may be employed therewith, a more detailed consideration of the cycle of operation of such an electric furnace will be undertaken, particularly with reference to the diagrammatic presentation of Figs. 5 through 9, inclusive, and accompanying notations. By way of explanatory example, the initial condition and form of electrode 11 about conductor 12, together with mold sections 17 and 18, has been assumed to be as shown in diagrammatic cross section in Fig. 5. As the electrode is consumed by operation of the furnace, conductor 12 with electrode 11 bonded thereto is periodically lowered as schematically indicated at 120 to maintain the lower surface of electrode 11 in current-carrying position, i.e. immersed in the furnace bath, not shown, until the lower electrode portion is consumed a predetermined amount, as indicated diagrammatically in Fig. 6, a predetermined unconsumed portion of the electrode, indicated at 13, remaining below conductor 12. When the electrode condition of Fig. 6 is achieved, conductor 12 and associated electrode 11 and mold sections 17 and 18 are vertically raised as a unit, by operation of screw elements 23 and 24, and rotated to place unconsumed electrode portion 13 and the eroded surface 16 thereof in upper position, as shown in Fig. 7, and the then lower surface of electrode 11 lowered to current-carrying position in the electric furnace, any necessary horizontal movement of the electrode 11 to allow the necessary rotative movement thereof being accomplished by adjustment of carriages 29 within cradles 21 through operation of screw elements 31, such manipulation and rotation being schematically indicated at 121. Following removal of eroded surface 16 from the furnace bath, and preferably when said eroded surface 16 is in upper horizontal position, as illustrated in Fig. 7, the eroded surface 16 is thoroughly cleaned of bath or other extraneous material and loose particles of electrode material, as by chipping, or rolling with a light cylinder having sharp protuberances, with removal of particles by vacuum means. Following such cleaning operation, mold sections 17 and 18 are maintained in pressing or restraining relation with electrode 11 for a substantial period of current conduction by electrode 11 and until the lower surface thereof is again consumed to a substantial degree, which action is accompanied by further periodic downward movement of the electrode to maintain the lower surface in current-carrying position, as schematically indicated at 122. When electrode 11 assumes a condition substantially as indicated at Fig. 8, mold sections 17 and 18 are retracted from the lower position thereof illustrated in Fig. 7 by operation of screw means 62 and 63, then vertically raised to upper position by operation of screw means 54 and 55, then restored to engaging position with respect to the boundaries of eroded surface 16, which latter position is shown in Fig. 8, and a layer 15 of electrode material in paste form and preferably of relatively high volatile content then applied to the eroded surface 16. Following such preparation of the eroded surface 16 and layer 15 of electrode paste, a substantially co-extensive pre-formed block 14 of electrode material is placed in contacting super-position on layer 15, the pressure applied by mold sections 17 and 18 being temporarily relaxed if necessary to accomplish such placement. Continued operation of the furnace and heat generated in conductor 12 and associated electrode material results in baking of the electrode paste layer 15, thus forming a bond between unconsumed electrode portion 13 and pre-formed block 14. Furnace operation progresses as before until the lower portion of the electrode is again consumed to substantially the electrode configuration shown in Fig. 6, at which point the electrode is again rotated and the renewal or replenishment steps of Figs. 7, 8 and 9 repeated on a cyclic basis, as indicated in the notation following Fig. 9.

Although the typical form of the invention presented utilizes two such electrodes in connection with a single pot or cathode 10 to form a single furnace unit, it will be apparent that a given furnace unit may adopt a single rotatable electrode or a multiplicity thereof as desired, it being readily also understood that a wide variety of structural modifications may be adopted to accomplish minimal weight consistent with necessary structural strength in various elements, such as the vertically movable cradle, horizontally movable carriage, or any of the rotative structure associated with electrode 11. It shall be further apparent that the various adjustment means are merely typical of those which may be employed, and that in particular installations advantages may be gained from ganged plural screw adjustments of like function, or by use of power control, or both. It is also contemplated that the design of conductor 12, consistent with the principle of wide distribution of current density to the conductive electrode surface, is subject to wide variation, for example, by provision of a multiplicity of vertically arranged projections integral with and normal to the wide transverse dimension of conductor 12 to further reduce the path of travel and consequent IR drop of the electric current through the baked electrode portion, the primary consideration in this regard being that such projections, when utilized, should not extend beyond the minimum unconsumed portion 13 of electrode 11 for reasons of bath contamination. It will be further apparent that generally conventional accessory arrangements may be utilized in association with an electric furnace in accordance with the present invention, such as ore feeding means advantageously directed into the relatively uncrusted bath portion between electrodes 11, and such as fume collecting hoods.

As previously indicated, and to some extent determined by the relative weight of pre-formed blocks employed, certain applications may utilize in the bonding layer 15 an electrode paste having substantially higher amounts of volatile binder and relatively greater fluidity than conventionally employed with self-baking electrodes of the Soderberg type, in order that the bonding material while in paste form will readily flow to all portions of the eroded surface 16 and opposed portions of pre-formed block 14 and permeate these parts to the greatest extent possible prior to baking.

The term "pre-formed block," as used in connection with block 14 in the embodiment described, shall be understood to relate to pressure molded or extruded forms of greater density than found in conventional self-baking practice, and that such term shall include a pre-baked block of electrode material or such a molded or extruded block which is partially baked only to the extent necessary to develop sufficient structural strength to be handled without substantial crumbling or breakage. In certain applications, it may be considered advantageous to have as little pre-baking as possible of the pre-formed block, consistent with the necessary structural strength, in order to promote adherence of the pre-formed block during baking in bonding position and by finally baking while in current-carrying position in the furnace with the current passing through the bonding layer of electrode material.

The various features, arrangements and methods of operation and manipulation of rotatable continuous electrodes herein disclosed may be embodied in electric furnaces for use, as indicated, in the electrolytic production of aluminum from alumina, and for use in other general smelting operation, the making of steel, the production of calcium carbide, and other similar fields of application wherein furnaces utilizing consumable electrodes of the continuous type are employed.

What is claimed is:

1. The method of replenishing a consumed electrode portion of an electric furnace electrode of the continuous type, comprising the steps of operating the electric furnace until a substantial lower portion of the electrode is consumed, removing the eroded surface of the electrode from current-carrying position in said electric furnace, positioning the original upper portion of the electrode in current-carrying position in said electric furnace, depositing a layer of electrode material in paste form to said eroded surface, placing a pre-formed block of electrode material in contacting relation with the layer of paste material so formed, and bonding said pre-formed block of electrode material to said eroded surface by baking of said electrode paste through continued operation of said electric furnace.

2. The method according to claim 1, further comprising returning the replenished electrode portion to current-carrying position in said electric furnace.

3. The method of replenishing a consumed electrode portion of an electric furnace electrode of the continuous type, comprising the steps of operating the electric furnace until a substantial lower portion of the electrode is consumed, removing the eroded surface of the electrode from current-carrying position in said electric furnace, positioning the original upper portion of the electrode in current-carrying position in said electric furnace, cleaning said eroded surface, depositing a layer of electrode material is paste form to said eroded surface while restraining such paste layer substantially to the boundaries of said eroded surface by a mold in surrounding relation with respect thereto, positioning a pre-formed block of electrode material in superposed contacting relation with the layer of electrode paste material so formed, and bonding said pre-formed block of electrode material to said eroded surface by baking of said electrode paste material through continued operation of said electric furnace.

4. The method according to claim 3, further comprising returning the replenished electrode portion to current-carrying position in said electric furnace.

5. The method according to claim 4, further comprising maintaining said mold in restraining relation with respect to said pre-formed block for a substantial period of conduction of electrical current through said restored electrode portion.

6. The method according to claim 5, further comprising maintaining said mold in restraining relation with respect to said eroded electrode and pre-formed block of electrode material while returning said replenished electrode portion to current-carrying position in said electric furnace.

7. The method of replenishing the consumable electrode material on an electrode of the continuous type, said electrode comprising a horizontally disposed, rotatable, current-carrying, metallic conductor adapted to be rotated in a horizontal plane over an electric furnace bath and being covered along the major portion of its length between the end portions with a layer of consumable electrode material, comprising the steps of operating the electric furnace until a substantial lower portion of the electrode is consumed, rotating the electrode about a horizontal axis thereof to remove the eroded electrode surface from current-carrying position in said electric furnace, positioning the original upper portion of the electrode in current-carrying position in said electric furnace, cleaning said eroded surface, placing a mold in substantial surrounding relation with respect to the boundaries of said eroded surface, applying a layer of electrode material in paste form to said eroded surface, placing a pre-formed block of electrode material in contacting relation with the layer of paste material so formed, and adhering said pre-formed block of electrode material to said eroded surface by baking of said electrode paste material through continued operation of said electric furnace.

8. The method according to claim 7, further comprising rotating said electrode about said horizontal axis to deliver the restored electrode portion to current-carrying position in said electric furnace.

9. The method according to claim 8, further comprising maintaining said mold in restraining relation with respect to said eroded electrode and pre-formed block while delivering said restored electrode portion to current-carrying position.

10. The method according to claim 9, further comprising maintaining said mold in restraining relation with respect to said restored electrode portion for a substantial period of conduction of electrical current through said restored electrode portion.

11. An electric furnace having a cathode and a non-metallic anode comprising a horizontally arranged, rotatable metallic conductor having bonded thereto an unconsumed anode portion having an eroded surface, and a pre-formed block of non-metallic electrode material bonded to said eroded surface, the axis of rotation of said metallic conductor passing through the zone defined by said unconsumed anode portion.

12. An electric furnace comprising a lower non-metallic cathode and an upper anode having a horizontally arranged metallic conductor rotatable about a horizontal axis, a non-metallic unconsumed electrode portion bonded to said conductor, such bonded electrode portion in turn having an eroded surface resulting from operation of said furnace, a baked layer of non-metallic electrode material interposed between and bonding said pre-formed block to said eroded surface, and opposed mold sections in substantially surrounding and restraining relation with respect to the contiguous external surfaces of said unconsumed electrode portion, said pre-formed block, and said layer of electrode material, the axis of rotation of said horizontally arranged metallic conductor passing through the zone defined by said unconsumed electrode portion.

13. An electric furnace according to claim 12, wherein the surface of said mold section in contact with said electrode external surfaces and said electrode external surfaces are provided with interfitting mold and electrode surface configurations to further restrain said pre-formed block from relative movement away from said unconsumed electrode portion.

14. An electric furnace according to claim 13, wherein such interfitting means comprises a plurality of retaining pins engaging said mold and embedded in said pre-formed block of electrode material.

15. An electric furnace according to claim 12, further comprising means mounting said mold sections for relative adjustment selectively perpendicular to and parallel to said contiguous external surfaces of said unconsumed electrode portion and said pre-formed block.

16. An electric furnace according to claim 15, further comprising means for rotating said electrode and mold section mounting means about the horizontal axis of rotation of said metallic conductor.

17. An electric furnace according to claim 16, further comprising means for selectively vertically and horizontally adjusting the position of said horizontal axis of rotation of said metallic conductor with respect to said cathode.

References Cited in the file of this patent

UNITED STATES PATENTS

| | | |
|---|---|---|
| 330,247 | Liepmann | Nov. 10, 1885 |
| 473,393 | Heroult | Apr. 19, 1892 |
| 1,185,959 | Walsh | June 6, 1916 |
| 2,061,146 | Ferrand | Nov. 17, 1936 |
| 2,654,707 | Saffel | Oct. 6, 1953 |
| 2,739,113 | Horsfield et al. | Mar. 20, 1956 |

FOREIGN PATENTS

| | | |
|---|---|---|
| 674,731 | Great Britain | July 2, 1952 |
| 58,956 | Germany | Oct. 10, 1891 |
| 746,978 | France | Mar. 21, 1933 |

UNITED STATES PATENT OFFICE
CERTIFICATE OF CORRECTION

Patent No. 2,959,526 November 8, 1960

John O. Graybeal

It is hereby certified that error appears in the above numbered patent requiring correction and that the said Letters Patent should read as corrected below.

Column 4, line 52, for "eletcrode" read -- electrode --; column 7, line 52, for "operation" read -- operations --; column 8, line 9, for "is" read -- in --.

Signed and sealed this 17th day of October 1961.

(SEAL)
Attest:

ERNEST W. SWIDER
Attesting Officer

DAVID L. LADD
Commissioner of Patents

USCOMM-DC